Jean-Luc Berry
INVENTOR
his ATTYS.

United States Patent Office 2,805,845
Patented Sept. 10, 1957

2,805,845

FRACTIONATING DISTILLING APPARATUS

Jean-Luc Berry, Paris, France

Application February 16, 1954, Serial No. 410,624

Claims priority, application France February 17, 1953

26 Claims. (Cl. 261—109)

The object of the invention is to provide improved distilling apparatus in order to increase both the output and efficiency of the distilling operation with given apparatus dimensions or to reduce the size of the apparatus with a given output.

In a column having conventional plates for the fractional distillation of a liquid, the distillation is carried out in the following manner. The liquid to be distilled flows downwardly from one plate to the next while the vapor rises in the opposite direction. The liquid extends over each plate at a depth determined by the height of the overflow pipe, and the vapor passing through a hydraulic seal bubbles through the liquid in which it forms bubbles which are entrained in the vapor space above the liquid under the plate disposed immediately above. This vapor space is the centre of two successive phenomena. Up to a certain height above the liquid there is a zone which may be called the phase-mixing zone which is occupied by the bubbles or a more or less coarse foam or froth; the vapor is still dispersed therein in the liquid phase. Above this zone is a second zone which might be called the phase-separating zone in which, the bubbles having a burst, the small drops of dense liquid descend towards the subjacent plate and the liberated vapor ascends towards the orifice of the upper plate. For an apparatus having given dimensions, the output and efficiency of distillation are limited at a maximum. Thus for a given transverse section of the column, the output depends on the ascending velocity of the vapor. Now, the latter cannot exceed a maximum above which the force of gravity acting on the descending liquid particles would be exceeded by the entraining effect of the vapor and result in a useless recycling of a part of the liquid towards the upper plate. Further, the efficiency of the exchanges between the two phases depends on the duration of contact and the area of the surface of contact between these two phases. Now, the duration of contact is limited by the space between successive plates, that is the height of the column, and the area of the surface of contact by the dimension of the bubbles. This dimension can only be reduced by admitting the vapor through very small apertures which almost invariably results in the formation of very troublesome foam.

The process adopted in the apparatus embodying the invention consists in the steps of causing the flow of a sheet of liquid along the edge of a plate or baffle whose lower face is adapted to guide in a substantially horizontal direction a current of vapor whose velocity is such that it causes the atomization of the sheet of liquid, the dispersion of the atomized sheet of liquid in the vapor current and the entrainment thereof in a substantially horizontal direction during which contact occurs between these two phases, then the collision of this current with an impact surface or wall substantially normal to the general direction of said current so as to ensure the separation of the two phases, and then so canalizing the liquid phase as to direct the latter downwardly and so canalizing the vapor phase as to direct the latter upwardly.

This arrangement remedies the aforementioned disadvantages. As the vapor and the liquid particles dispersed therein follow substantially the same horizontal path, no obstacle is in the way of an increase in the vapor velocity and hence the output, since, contrary to that which occurs in conventional columns, there is no risk of the increased kinetic energy of the vapor preventing the small drops of liquid in suspension in the vapor from descending and thereby causing an untimely re-cycling of the liquid. The separation of the phases is positively ensured by the collision of the fluid current against the separating surface or wall and the kinetic energy of the small dense drops of liquid prevent these small drops from being entrained upwardly by the vapor at the moment when the latter, having spent the major part of its horizontal momentum as a result of the collision, is canalized towards an upper plate.

The invention has for object to provide a distillation apparatus comprising in combination with a column: a distillation plate connected to a first side of and extending partially across the column, an unobstructed liquid discharge sill provided on the end of the plate which is remote from its connection to the column, a liquid trough for supplying liquid to the plate, a vapor inlet disposed below the latter, a lower guide screen disposed below and in spaced relation to the plate, said lower guide screen extending transversely of the column from a region adjacent the side of the column which is opposite said first side of the latter beyond a vertical plane containing said liquid discharge sill but terminating short of said first side of the column and being so constructed and disposed relative to the plate and the column that it constrains the vapor arriving from below to assume an accelerated velocity in a substantially horizontal direction between the lower guide screen and said plate as the vapor passes through said vertical plane, said side of the column opposite said first side forming a collision wall, with which the vapor having entrained liquid particles from the liquid discharge sill collides, whereby the vapor is separated from the liquid phase, and an upper guide screen disposed above the plate, said upper guide screen extending from a region adjacent said first side of the column and transversely of the column beyond said vertical plane but terminating short of the side of the column opposite said first side thereof for screening and upwardly guiding the separated vapor, the end of the upper guide screen adjacent said first side of the column being disposed in the liquid trough, whereby the liquid in said trough forms a hydraulic seal between the plate and the upper guide screen.

In the accompanying drawing, which shows by way of example several embodiments of the invention:

Figure 1:
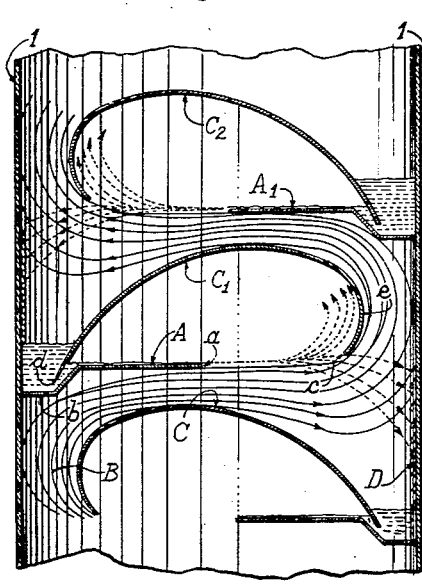
Fig. 1 is a diagrammatic view of an apparatus according to the invention.

With reference to Fig. 1, 1 designates the lateral walls of a chamber, for example the cylindrical wall of a distillation column in which are disposed preferably several tiers of superposed distillation decks, it being understood that the invention concerns also a distillation apparatus which comprises only one distillation deck.

Such a deck comprises a liquid distributing baffle or plate A which is terminated by a substantially horizontal liquid discharge sill or edge $a$ and is supplied with liquid by a vapor sealing trough $b$, a vapor inlet B disposed under the plate A, a lower vapor guide surface or screen C also disposed under the plate A for causing the vapor current arriving through B to assume an accelerated velocity in a substantial horizontal direction, a collision surface or wall D, which in this example is formed by the inner wall of the cylinder 1 is spaced from the liquid discharge edge $a$ and is substantially normal to the direction in which the vapor current is guided, and an upper vapor guide surface or screen $C_1$ disposed above the plate A, the lower edge $c$ of the upper guide surface being situated in front relative to the direction of flow of the vapor and spaced from the liquid discharge edge $a$ and from the collision surface D, and the lower free edge $d$ of the upper guide surface being situated at the rear and forming with the trough $b$ a hydraulic seal, said surface $C_1$, which in this example is of volute shape, having its convexity directed as shown at $e$ towards the collision surface D. The surfaces C, A, and $e$ have such shapes and relative positions as to create an increase in section from the liquid discharge edge $a$ to the collision surface D.

The foregoing structure enables the above-described high efficiency and high output distillation process to be carried out. The liquid arrives at the trough $b$, spreads over the plate A in a shallow layer and flows over the liquid discharge edge $a$. At this point the liquid encounters a current of vapor which is travelling at high velocity and arrives from B, the velocity of this vapor being increased by the accelerating action of the convergent nozzle-like shape of the space between the plate A and the lower guide surface C. This current has a substantially horizontal direction. Upon entering into contact with the liquid it causes the latter to become atomized and the small drops thus formed are dispersed in the vapor and are entrained by the latter in a substantially horizontal direction towards the collision or impact surface D. The space between the liquid discharge edge $a$ and the collision surface D determines, for a given flow of vapor, the duration of contact between the two phases between which the exchanges necessary for distillation must be effected. The atomization or pulverization of the liquid also gives rise to drops of small dimension which ensures a very extensive surface of contact. This dimension is a value which may be controlled, contrary to that which occurs in columns provided with conventional plates where the drops are caused by the rupture of vapor bubbles and their dimension cannot be reduced beyond a certain limit without possibly causing the production of foam, which is one of the main problems in distilling processes. The dimension $aD$ may be quite large without increasing the height of the column.

Furthermore, the high velocity of the vapor governed by a high flow has not the disadvantage of carrying away a large proportion of liquid towards the upper deck as occurs in conventional distillation apparatuses, this causing an untimely recycling of the liquid and reducing the efficiency of the apparatus. The small drops are propelled by the vapor and assume considerable kinetic energy, which permits them to attain the collision surface D despite the fact that the vapor current is upwardly turned or directed between the part $e$ of the upper guide surface and the collision surface D. With this kinetic energy is combined the force of gravity which turns or directs the flux of liquid particles downwardly. The liquid-entraining effect of the vapor decreases as the liquid particles and vapor leave the liquid discharge edge $a$ and approach the collision surface D, firstly on account of the spreading out of the current caused by the shape of the surfaces C and $e$, which causes a reduction in the vapor current velocity and, secondly, on account of the collision of the vapor jets against the surface D which still more reduces the velocity and causes the phases to separate, the small drops of liquid adhering to the surface D and running down the latter, whereas the vapor rises towards the upper deck.

A part of the liquid is projected against the lower surface of the screen $C_1$ and falls into the space $ac$, where it is taken up again by the vapor current, or is returned to the plate A. This does not constitute a disadvantage, since this part of the liquid has not passed through the vapor flux and has therefore not yet participated in the exchange.

In the illustrated example the column includes a series of superposed units or decks and the surface $C_1$ forms both the upper guide surface or screen for the subjacent deck and the lower guide surface for the deck above, where $A_1$ represents the liquid supplying plate and $C_2$ the upper guide surface. It can be seen that the vapor attains the upper deck and is enriched with volatile products whereas the liquid descends from one deck to the next by running along the wall and is collected in the trough $b$ of the deck below.

Figure 2:
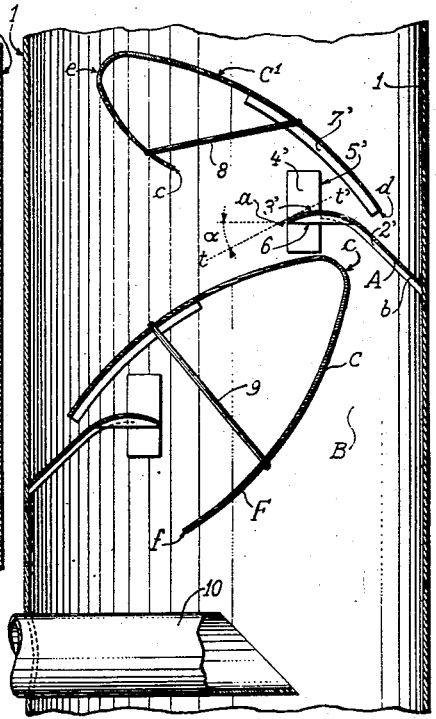
Fig. 2 is a vertical sectional view of a distillation column, this view being taken near the vapor inlet pipe, along line X—Y of Fig. 3.
Figure 3:
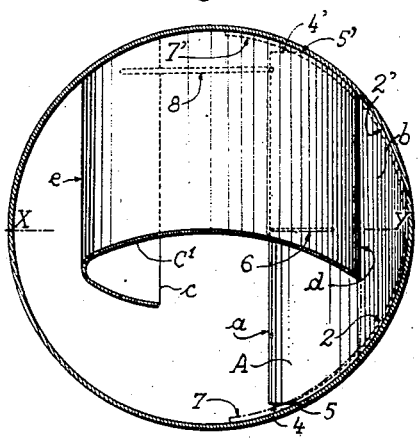
Fig. 3 is a horizontal sectional view of the column shown in Fig. 2 with a part cut away.

Figs. 2 and 3 show a practical embodiment of the invention wherein the column 1 is cylindrical. The plate A is a curved sheet of metal whose opposite edges 2 and 2′ are formed over and are welded to the inner wall of the column. The front part of the plate forms a liquid discharge sill or edge $a$ having such length that the ends thereof are spaced from the cylindrical wall 1 and are welded to lateral deflectors 4, 4′ welded to the cylindrical wall 1 along their edges 5, 5′. This arrangement tends to guide the vapor current and the liquid in a direction parallel to the diametral plane X—Y of the column.

It will be observed that the liquid discharge edge $a$ follows a curved part of the plate 3′ the tangent $t$—$t'$ of which makes a small angle $\alpha$ with the horizontal. This arrangement imparts to the liquid particles an initial acceleration in the direction of the tangent $t$—$t'$ which has a component acting in the same direction as the force of gravity. The general direction of the vapor-liquid flux is still horizontal since the path of the vapor soon curves upwardly. This component, which is added to the force of gravity acting on the small drops of liquid contributes to prevent them from being entrained by the vapor current towards the upper decks.

Preferably, the sheet of metal is stiffened or reinforced at suitable points, for example in the plane X—Y, by shaped metallic stiffeners such as those shown at 6 which are welded to the lower face of the plates A.

The volutes C, $C_1$ etc. are composed of suitably formed or curved plates whose formed-up edges 7, 7′ are welded to the inner wall of the column. These plates are made rigid by rods such as those shown at 8 which are welded at their ends to the plate.

In Fig. 2 there is shown the vapor inlet pipe 10, which discharges at the base of the column under the lower member C which is shown extended from $c$ to $f$ by an extension piece F. Lower spacer members such as those shown at 9 are provided to ensure rigidity.

Figure 4:
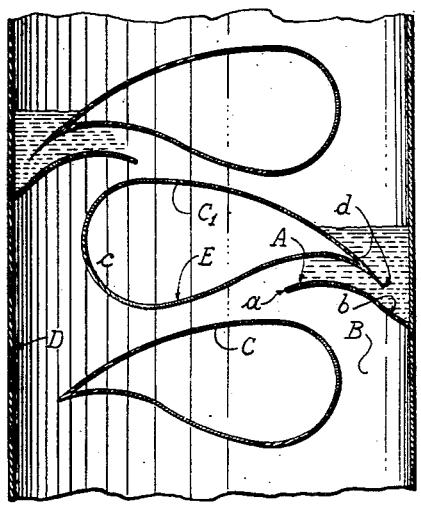
Fig. 4 is a diagrammatic view of a modification of the invention.

In the example shown in Fig. 4, the surfaces such as C, $C_1$ are extended between the points $c$ and $d$ by members such as E. This arrangement ensures that the vapor and gas are positively guided and thus constrains the whole of the liquid phase to pass through the vapor current.

Although specific embodiments of the invention have been described hereinbefore, it must be understood that many changes and modifications may be made therein without departing from the spirit of the invention or the scope of the appended claims.

Further, it should be understood that the invention is equally applicable in the case of a process in which distillation is carried out by means of a gas or auxiliary vapor.

Having now described my invention what I claim as new and desire to secure by Letters Patent is:

1. In a distillation apparatus, in combination with a column: a distillation plate connected to a first side of and extending partially across the column, an unobstructed liquid discharge sill being provided on the end of the plate which is remote from its connection to the column, a liquid trough for supplying liquid to the upper surface of the plate, a vapor inlet disposed below the plate, a lower guide screen disposed below and in spaced relation to the plate, said lower guide screen extending transversely of the column from a region adjacent the side of the column which is opposite said first side thereof and beyond a vertical plane containing said liquid discharge sill but terminating short of said first side of the column and being so constructed and disposed relative to the plate and the column that it constrains the vapor arriving from below to assume an accelerated velocity in a substantially horizontal direction between the lower guide screen and said plate as the vapor passes through said vertical plane, said side of the column opposite said first side forming a collision wall, with which the vapor having entrained liquid particles from the liquid discharge sill collides, whereby the vapor is separated from the liquid phase, and an upper guide screen disposed above the plate, said upper guide screen extending from a region adjacent said first side of the column and transversely of the column beyond said vertical plane but terminating short of the side of the column opposite said first side thereof for screening and upwardly guiding the separated vapor, the end of the upper guide screen adjacent said first side of the column being disposed in the liquid trough, whereby the liquid in said trough forms a hydraulic seal between the plate and the upper guide screen.

2. In a distillation apparatus, the combination as claimed in claim 1, wherein said liquid discharge sill is horizontally disposed.

3. In a distillation apparatus, the combination as claimed in claim 1, wherein the portion of said plate which is adjacent the liquid discharge sill is tangent to a substantially horizontal plane.

4. In a distillation apparatus, the combination as claimed in claim 1, wherein the column is cylindrical and the length of the liquid discharge sill of the plate is shorter than the width of the column in said vertical plane containing the liquid discharge sill, two substantially vertical and parallel deflectors being provided at each end of the liquid discharge sill of the plate.

5. In a distillation apparatus, in combination with a column: a distillation plate connected to a first side of and extending partially across the column, an unobstructed liquid discharge sill provided on the end of the plate which is remote from its connection to the column, a liquid trough for supplying liquid to the upper surface of the plate, a vapor inlet disposed below the latter, a lower guide screen disposed below and in spaced relation to the plate, for constraining the vapor arriving from below to assume an accelerated velocity in a substantially horizontal direction between the lower guide screen and the plate, said lower guide screen extending transversely of the column from a region adjacent the side of the column opposite said first side of the latter and beyond a vertical plane containing said liquid discharge sill but terminating short of said first side of the column, said side of the column opposite said first side forming a collision wall, with which the vapor having entrained liquid particles from the liquid discharge sill collides, whereby the vapor is separated from the liquid phase, and an upper guide screen disposed above the plate, said upper guide screen extending from a region adjacent said first side of the column and transversely of the column beyond said vertical plane but terminating short of the side of the column opposite said first side thereof for screening and upwardly guiding the separated vapor, the end of the upper guide screen adjacent said first side of the column being disposed in the liquid trough whereby the liquid in said trough forms a hydraulic seal between the plate and the upper guide screen, said guide screens having such shapes and positions relative to the plate and column as to define a passageway which varies in section in such manner that, in the direction of movement of the vapor guided by said guide screens, the section of said passageway decreases substantially progressively in a direction towards a plane substantially coincident with said vertical plane and thereafter increases.

6. In a distillation apparatus, in combination with a column: a distillation plate connected to a first side of and extending partially across the column, an unobstructed liquid discharge sill provided on the end of the plate which is remote from its connection to the column, a liquid trough for supplying liquid to the plate to flow over said sill, a vapor inlet disposed below the latter, a lower guide screen disposed below and in spaced relation to the plate, said lower guide screen extending transversely of the column from a region adjacent the side of the column which is opposite said first side of the latter and beyond a vertical plane containing said liquid discharge sill but terminating short of said first side of the column and being so constructed and disposed relative to the plate and the column that it constrains the vapor arriving from below to assume an accelerated velocity in a substantially horizontal direction between the lower guide screen and said plate as the vapor passes through said vertical plane, said side of the column opposite said first side forming a collision wall, with which the vapor having entrained liquid particles from the liquid discharge sill collides, whereby the vapor is separated from the liquid phase, and an upper guide screen disposed above the plate, said upper guide screen extending from a region adjacent said first side of the column and transversely of the column beyond said vertical plane but terminating short of the side of the column opposite said first side thereof for screening and upwardly guiding the separated vapor, the end of the upper guide screen adjacent said first side of the column being disposed in the liquid trough, whereby the liquid in said trough forms a hydraulic seal between the plate and the upper guide screen, the end of the upper guide screen remote from the end thereof disposed in the liquid trough being nearer to said side of the column opposite said first side than to the liquid discharge sill.

7. In a distillation apparatus, in combination with a column: a distillation plate connected to a first side of and extending less than half-way across the column, an unobstructed liquid discharge sill provided on the end of the plate which is remote from its connection to the column, a liquid trough for supplying liquid to the plate, a vapor inlet disposed below the latter, a lower guide screen disposed below and in spaced relation to the plate, said lower guide screen extending transversely of the column from a region adjacent the side of the column which is opposite said first side of the latter and beyond a vertical plane containing said liquid discharge sill but terminating short of said first side of the column and being so constructed and disposed relative to the plate and the column that it constrains the vapor arriving from below to assume an accelerated velocity in a substantially horizontal direction between the lower guide screen and said plate as the vapor passes through said vertical plane, said side of the column opposite said first side forming a collision wall, with which the vapor having entrained liquid particles from the liquid discharge sill collides, whereby the vapor is separated from the liquid phase, and an upper guide screen disposed above the plate, said upper guide screen extending from a region adjacent said first side of the column and transversely of the column beyond said vertical plane but terminating short of the side of the column opposite said first side thereof for screening and upwardly guiding the separated vapor, the end of the upper guide screen adjacent said first side of the column being disposed in the liquid trough whereby the liquid in said trough forms a hydraulic seal between the plate and the upper guide screen.

8. In a distillation apparatus, the combination as claimed in claim 1, wherein each guide screen is in the form of a closed loop.

9. In a distillation apparatus, in combination with a column: a distillation plate connected to a first side of and extending less than half-way across the column, an unobstructed liquid discharge sill provided on the end of the plate which is remote from its connection to the column, a liquid trough for supplying liquid to the plate to flow over said sill, a vapor inlet disposed below the latter, a lower guide screen disposed below and in spaced relation to the plate for constraining the vapor arriving from below to assume an accelerated velocity in a substantially horizontal direction between the lower guide screen and the plate, said lower guide screen extending transversely of the column from a region adjacent the side of the column opposite said first side of the latter and beyond a vertical plane containing said liquid discharge sill but terminating short of said first side of the column, said side of the column opposite said first side forming a collision wall, with which the vapor having entrained liquid particles from the liquid discharge sill collides, whereby the vapor is separated from the liquid phase, and an upper guide screen disposed above the plate, said upper guide screen extending from a region adjacent said first side of the column and transversely of the column beyond said vertical plane but terminating short of the side of the column opposite said first side thereof for screening and upwardly guiding the separated vapor, the end of the upper guide screen adjacent said first side of the column being disposed in the liquid trough whereby the liquid in said trough forms a hydraulic seal between the plate and the upper guide screen, said guide screens having such shapes and positions relative to the plate and column as to define a passageway which varies in section in such manner that, in the direction of movement of the vapor guided by said guide screens, the section of said passageway decreases substantially progressively in a direction towards a plane substantially coincident with said vertical plane and thereafter increases.

10. In an installation as claimed in claim 9, wherein said liquid discharge sill is horizontal.

11. In an installation as claimed in claim 9, wherein said ends of each of the guide screens are connected by an extension so that each of the upper guide screens is in the form of a closed loop.

12. In a distillation apparatus, in combination with a column: a plurality of distillation plates arranged in vertically spaced relation to one another, connected alternately to one side and then the opposite side of the column and extending partially across the interior of the latter, an unobstructed liquid discharge sill provided on the end of each plate that is remote from its connection to the column, a liquid trough provided for each plate for supplying liquid to the latter to flow over said discharge sill, a vapor inlet disposed below the lowermost plate, each plate being provided with a lower guide screen disposed below the plate for constraining the vapor arriving from below to assume an accelerated velocity in a substantially horizontal direction between the lower guide screen and the corresponding plate, said lower guide screen extending transversely of the column from a region adjacent the side of the column opposite that to which the corresponding plate is connected and beyond a vertical plane containing the liquid discharge sill of the plate but terminating short of the side of the column to which the plate is connected, the side of the column opposite that to which the plate is connected forming a collision wall, with which the vapor having entrained liquid particles from the liquid discharge sill, collides, whereby the vapor is separated from the liquid phase, each plate being further provided with an upper guide screen disposed above the plate for the purpose of screening and upwardly guiding the separated vapor, the upper guide screen of each plate being in fact the lower guide screen of the plate immediately above, one end of each upper guide screen being disposed in the liquid trough of the plate immediately therebelow, whereby the liquid in the trough forms a hydraulic vapor seal between the plate and the upper guide screen, said guide screens having such shapes and positions each relative to the plate immediately thereabove and to the column as to define a passageway which varies in section in such manner that, in the direction of movement of the vapor guided by each of said guide screens, the section of said passageway decreases substantially progressively towards a plane substantially coincident with said vertical plane and thereafter increases.

13. In a distillation apparatus, the combination as claimed in claim 12, wherein each liquid discharge sill is horizontal.

14. In a distillation apparatus, the combination as claimed in claim 12, wherein the end of each upper guide screen remote from the end thereof disposed in the liquid trough is nearer to the side of the column forming the collision wall than to the liquid discharge sill of the plate immediately therebelow.

15. In a distillation apparatus, the combination as claimed in claim 12, wherein the two ends of each upper guide screen are connected by an extension portion so that the guide screen is in the form of a closed loop.

16. In a distillation apparatus, as the combination as claimed in claim 12, wherein each distillation plate extends less than half-way across the interior of the column in the direction perpendicular to the liquid discharge sill.

17. In a distillation apparatus, the combination as claimed in claim 12, wherein no lower guide screen is provided for the lowermost plate, an extension being provided on the upper guide screen for the lowermost plate, said extension being disposed at the end of said upper guide screen which is remote from the end thereof which is disposed in said liquid trough and extending downwardly and terminating at a level below that of said liquid discharge sill of the lowermost plate whereby the path of the liquid from the latter is separated from that of the vapor that issues from said vapor inlet.

18. In a distillation apparatus, the combination as claimed in claim 12, wherein said guide screens have an arched shape.

19. Fractionating distillation apparatus comprising, in combination: means defining an upright hollow tower; a liquid distributing member disposed within said tower, said distributing member having a horizontally extending upper surface, said surface terminating in an elongated distributing edge spaced inwardly from said tower defining means; inlet means for introducing vapor into said tower below said distributing member; guide means disposed intermediate said inlet means and said distributing member for directing said vapor horizontally, said guide means extending convergently toward said elongated edge for accelerating the horizontal velocity of said vapor as it passes beneath said edge to cause atomization of any liquid flowing over said edge; means defining a vertically extending impact surface disposed beyond said side edge and in the path of said vapor of accelerated horizontal velocity; further guide means for directing vapor upwardly from said impact surface; and means communicating with said further guide means for returning liquid entrained and subsequently released by the vapor which is directed upwardly by said further guide means to said upper surface of said distributing member.

20. Apparatus according to claim 19, wherein said tower defining means simultaneously defines said impact surface, said impact surface being an inner wall surface of said tower.

21. Fractionating distilling apparatus of the class described comprising, in combination: means defining a hollow tower; a plurality of liquid distributing members disposed in vertically spaced relationship within said tower, each of said distributing members having a horizontally extending upper surface, each of said surfaces terminating in an elongated distributing edge spaced inwardly from said tower defining means; inlet means for introducing vapor into said tower below the lowermost of said distributing members; a plurality of guide means each disposed beneath one of said distributing members and above said inlet means for directing said vapor horizontally, each of said guide means extending convergently toward said elongated edge of the distributing member beneath which it is disposed for accelerating the horizontal velocity of said vapor as it passes beneath said edge to cause atomization of any liquid flowing over said edge; means defining a plurality of vertically extending impact surfaces, each disposed beyond one of said edges in the path of said vapor of accelerated velocity, each of said impact surfaces except the lowermost thereof communicating with the upper surface of the distributing member immediately therebelow for the return of liquid thereto; a plurality of further guide means each disposed above one of said distributing members for directing vapor upwardly from the impact surface which is disposed in the path of said vapor passing beneath said edge of the particular distributing member above which said further guide means is disposed; and return means communicating with each of said further guide means for returning any liquid dsposited thereon to said surface of said last-named distributing member.

22. Fractionating distillation apparatus comprising, in combination: means defining an upright hollow tower; a first baffle member disposed within said tower, said baffle member having a horizontally extending upper surface for flowing liquid thereacross, said surface terminating in an elongated free edge spaced inwardly from said tower defining means; inlet means for introducing vapor into said tower below said baffle member; a second baffle member disposed intermediate said inlet means and said first baffle member for directing said vapor horizontally, said second baffle member extending convergently toward said free edge for accelerating the horizontal velocity of said vapor as it passes beneath said edge for causing the atomization of liquid flowing over said edge; means defining a vertically extending impact surface disposed beyond said free edge and in the path of said vapor of accelerated horizontal velocity; a third baffle member disposed for directing vapor upwardly from said impact surface; and means communicating with said third baffle member for returning to said upper surface of said first baffle member such liquid as may be entrained and subsequently released by the vapor which is directed upwardly by said third baffle member.

23. Apparatus according to claim 22, wherein said tower defining means further defines said impact surface, said impact surface being an inner wall surface of said tower.

24. Apparatus according to claim 22, further comprising combined liquid flowing and vapor sealing means interposed between said third baffle member and said upper surface of said first baffle member.

25. Fractionating distilling apparatus of the class described comprising, in combination: means defining a hollow tower; a plurality of liquid distributing baffles disposed in vertically spaced relationship within said tower, each of said distributing baffles having a horizontally extending upper surface for the flow of liquid thereover, each of said surfaces terminating in an elongated free distributing edge spaced inwardly from said tower defining means; inlet means for introducing vapor into said tower below the lowermost of said distributing baffles; a plurality of guide baffles each disposed beneath one of said distributing baffles and above said inlet means for directing said vapor horizontally, each of said guide baffles extending convergently toward said free edge of the distributing baffle beneath which it is disposed for accelerating the horizontal velocity of said vapor as it passes beneath said edge to a velocity sufficient to cause the atomization of any liquid flowing over said edge; means defining a plurality of vertically extending impact surfaces, each disposed beyond one of said edges and in the path of said vapor of accelerated velocity, each of said impact surfaces except the lowermost thereof communicating with the upper surface of the distributing baffle immediately therebelow for the return of liquid thereto; a plurality of further guide baffles each disposed above one of said distributing baffles and in communication with one of said impact surfaces for directing vapor upwardly from said impact surface to the next higher distributing baffle, if any; and return means including a vapor seal through which liquid may pass, said return means communicating with each of said further guide baffles for returning any liquid deposited thereon to said upper surface of the distributing baffle immediately therebelow.

26. Apparatus according to claim 25, and which comprises a vertically spaced series of unitary baffle members, each of said unitary members comprising an upper portion which provides one of said distributing baffles and a lower portion which provides both one of said guide baffles and one of said further guide baffles.

References Cited in the file of this patent

UNITED STATES PATENTS

| | | |
|---|---|---|
| 732,548 | Guillaume | June 30, 1903 |
| 960,223 | Guillaume | May 31, 1910 |
| 1,028,156 | Trinks | June 4, 1912 |
| 2,678,201 | Koch | May 11, 1954 |

FOREIGN PATENTS

| | | |
|---|---|---|
| 196,919 | Germany | Apr. 7, 1908 |
| 978,917 | France | Nov. 29, 1950 |